United States Patent
Yanagioka

(10) Patent No.: US 9,221,962 B2
(45) Date of Patent: *Dec. 29, 2015

(54) RUBBER COMPOSITION AND PNEUMATIC TIRE USING THE SAME

(75) Inventor: Masaki Yanagioka, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 359 days.

This patent is subject to a terminal disclaimer.

(21) Appl. No.: 13/809,103

(22) PCT Filed: Jul. 8, 2011

(86) PCT No.: PCT/JP2011/003947
§ 371 (c)(1),
(2), (4) Date: Mar. 27, 2013

(87) PCT Pub. No.: WO2012/005013
PCT Pub. Date: Jan. 12, 2012

(65) Prior Publication Data
US 2013/0178557 A1    Jul. 11, 2013

(30) Foreign Application Priority Data

Jul. 9, 2010 (JP) ................... 2010-157013
Nov. 10, 2010 (JP) ................... 2010-252338

(51) Int. Cl.
*C08K 7/26* (2006.01)
*B60C 1/00* (2006.01)
*C08K 3/36* (2006.01)
*C08K 5/548* (2006.01)

(52) U.S. Cl.
CPC .............. *C08K 7/26* (2013.01); *B60C 1/0016* (2013.04); *C08K 3/36* (2013.01); *C08K 5/548* (2013.01); *C08K 2201/006* (2013.01)

(58) Field of Classification Search
CPC ....... C08L 7/00; C08K 3/34; C08K 2201/011
USPC ....................................... 523/218
See application file for complete search history.

(56) References Cited

U.S. PATENT DOCUMENTS

| 4,481,327 | A  | * | 11/1984 | Ogawa et al. ................. 524/432 |
| 2005/0004297 | A1 |  | 1/2005  | Durel et al. |
| 2011/0046263 | A1 |  | 2/2011  | Hoshino et al. |

FOREIGN PATENT DOCUMENTS

| CN | 1541245 A | 10/2004 |
| JP | 8-48818 A | 2/1996 |
| JP | 10-194723 A | 7/1998 |
| JP | 11-228740 A | 8/1999 |
| JP | 11-236208 A | 8/1999 |
| JP | 11-240982 A | 9/1999 |
| JP | 2005-500420 A | 1/2005 |
| JP | 2007-138069 A | 6/2007 |
| JP | 2008-179675 A | 8/2008 |
| JP | 2008-308517 A | 12/2008 |
| JP | 2009-287019 A | 12/2009 |
| WO | 2009133936 A1 | 11/2009 |

OTHER PUBLICATIONS

Machine Translation of JP 11-228740.*
Notification of Reasons for Refusal issued Aug. 19, 2014 in corresponding Japanese Patent Application No. 2010-157013 with English translation.
Notification of Reasons for Refusal issued Aug. 19, 2014 in corresponding Japanese Patent Application No. 2010-252338 with English translation.
Second Office Action issued Nov. 24, 2014 in corresponding Chinese Patent Application No. 201180043416.6 with English translation.
Office Action issued Apr. 22, 2014 in corresponding Russian Patent Application No. 2013105467 with English translation.
Office Action dated Mar. 19, 2014 issued in counterpart Chinese Patent Application No. 201180043416.6.
Office Action dated Mar. 27, 2014 issued in counterpart Korean Patent Application No. 10-2013-7003450.

* cited by examiner

*Primary Examiner* — Hannah Pak
(74) *Attorney, Agent, or Firm* — Sughrue Mion, PLLC

(57) ABSTRACT

An object of the present invention is to provide a rubber composition capable of achieving both good rolling resistance properties and good wear resistance in a compatible manner when the rubber composition is applied to a component member, e.g. tread, of a tire. Specifically, the present invention provides a rubber composition comprising a rubber composition and hydrated silica, wherein "CTAB" ($m^2/g$) as specific surface area by cetyltrimethylammonium bromide adsorption and "IB" as ink bottle-shaped micropore index, of the hydrated silica, satisfy a specific relationship and "weight loss on ignition" (mass %) as weight loss when the hydrate silicate is heated at 750 ° C. for 3 hours and "weight loss on heating" (mass %) as weight loss when the hydrate silicate is heated at 105 ° C. for 2 hours satisfy a specific relationship.

8 Claims, 2 Drawing Sheets

RUBBER COMPOSITION AND PNEUMATIC TIRE USING THE SAME

CROSS REFERENCE TO RELATED APPLICATIONS

This application is a National Stage of International Application No. PCT/JP2011/003947 filed Jul. 8, 2011, claiming priority based on Japanese Patent Application Nos. 2010-157013 filed Jul. 9, 2010 and 2010-252338 filed Nov. 10, 2010, the contents of all of which are incorporated herein by reference in their entirety.

TECHNICAL FIELD

The present invention relates to a rubber composition capable of achieving both good rolling resistance properties and good wear resistance in a sufficiently compatible manner when the rubber composition is applied to a component member of a tire. The present invention also relates to a pneumatic tire using the rubber composition.

BACKGROUND ART

A pneumatic tire is generally required to have high capacity of simultaneously satisfying various requirements of plural, different performances. In particular, a component member of a tire such as tread is keenly required to achieve both good rolling resistance properties and good wear resistance in a compatible manner. However, there have been quite a few trial-and-errors in the prior art in this connection because good rolling resistance properties and good wear resistance are basically inconsistent with each other.

Hydrated silica has been used as one of reinforcement fillers in a rubber composition applied to tire tread. In general, increase in content of reinforcement filers blended in a tire improves wear resistance of the tire to some extent but possibly deteriorates rolling resistance properties thereof and may result in poor workability due to too high viscosity of unvulcanized rubber in some applications.

In view of this, there has been developed a technique of improving dispersibility of hydrated silica particle into rubber components of a tire by employing hydrated silica having large-size primary particles, to improve rolling resistance properties of the tire. In this connection, Patent Literature 1, which noticed that use of hydrated silica having large-size primary particles possibly deteriorates storage modulus of a tire, discloses a technique of using hydrated silica of which coagulation force and the like have been controllably modified in order to improve storage modulus and reduce heat generation of a tire, with maintaining good dispersibility of hydrated silica.

CITATION LIST

Patent Literature

PTL 1: JP-A 2007-138069

SUMMARY OF THE INVENTION

Technical Problems

In a case where hydrated silica having large-size primary particles is used, however, not only storage modulus of a tire may deteriorate as described above but also wear resistance of the tire may be degraded, although rolling resistance properties of the tire improve to some extent. Further, if the hydrated silica having large-size primary particles is replaced with hydrated silica of which coagulation force and the like have been controllably modified, there still remains room for improvement in terms of achieving both good rolling resistance properties and good wear resistance of a tire in a compatible manner.

Particles of hydrated silica each generally have at the outer surface thereof numerous micropores with openings and these micropores involve adsorption of chains of rubber molecules. It is therefore assumed that configurations of micropores of hydrated silica particles closely relate to and thus control thereof could make significant contribution to improving rolling resistance properties and wear resistance of a tire. Configurations of micropores of hydrated silica particles need to be appropriately specified in this regard.

In view of the facts described above, an object of the present invention is to provide a rubber composition capable of achieving both good rolling resistance properties and good wear resistance in a sufficiently compatible manner when the rubber composition is applied to a component member, e.g. tread, of a tire.

Solution to the Problems

The inventors of the present invention, in order to solve the aforementioned problems, discovered a rubber composition blended with hydrated silica having specific physical properties involving configurations of micropores with openings formed at the outer surface of each particle of the hydrated silica, thereby completing the present invention.

Specifically, a rubber composition according to a first aspect of the present invention, comprises:
a rubber component; and
a hydrated silica having particles each provided with micropores with openings in the range of $1.2 \times 10^5$ nm to 6 nm formed at outer surface of the particle,
wherein in measurement according to a mercury press-in method using a mercury porosimeter of the hydrated silica, provided that:
"M1" (nm) represents diameter of the opening exhibiting the maximum value of mercury charge rate when pressure is increased from 1 PSI to 32000 PSI;
"M2" (nm) represents diameter of the opening exhibiting the maximum value of mercury discharge rate when pressure is decreased from 32000 PSI to 1 PSI;
"IB" represents "ink bottle-shaped micropore index";

$$IB = M2 - M1 \qquad (X); \text{ and}$$

"CTAB" ($m^2/g$) represents specific surface area by cetyltrimethylammonium bromide adsorption,
IB and CTAB satisfy following formula (I).

$$IB \leq -0.36 \times CTAB + 86.8 \qquad (I)$$

A rubber composition according to a second aspect of the present invention, comprises:
a rubber component; and
a hydrated silica having particles each provided with micropores with openings in the range of $1.2 \times 10^5$ nm to 6 nm formed at outer surface of the particle,
wherein in measurement according to a mercury press-in method using a mercury porosimeter of the hydrated silica, provided that:
"M1" (nm) represents diameter of the opening exhibiting the maximum value of mercury charge rate when pressure is increased from 1 PSI to 32000 PSI;

"M2" (nm) represents diameter of the opening exhibiting the maximum value of mercury discharge rate when pressure is decreased from 32000 PSI to 1 PSI;

"IB" represents "ink bottle-shaped micropore index";

$$IB = M2 - M1 \qquad (X);$$

"CTAB" (m²/g) represents specific surface area by cetyltrimethylammonium bromide adsorption;

"weight loss on ignition" (mass %) represents weight loss when the hydrated silica is heated at 750° C. for 3 hours; and "weight loss on heating" (mass %) represents weight loss when the hydrated silica is heated at 105° C. for 2 hours, IB and CTAB satisfy following formula (I') and formula (II) and "weight loss on ignition" and "weight loss on heating" satisfy formula (III).

$$IB \le -0.56 \times CTAB + 110.4 \text{ (when } CTAB \le 140) \qquad (I')$$

$$IB \le -0.20 \times CTAB + 60.0 \text{ (when } CTAB > 140) \qquad (II)$$

("weight loss on ignition"−"weight loss on heating")
$$\ge 2.5 \text{ (mass \%)} \qquad (III)$$

A specific surface area by cetyltrimethylammonium bromide adsorption (CTAB) of the hydrated silica is preferably in the range of 50 m²/g to 300 m²/g. 10 to 150 parts by mass of the hydrated silica may be blended with 100 parts by mass of the rubber component.

1 to 20 parts by mass of silane coupling agent may be blended with 100 parts by mass of the hydrated silica.

The silane coupling agent is preferably at least one type of compounds selected from the group consisting of a compound represented by following formula (IV), a compound represented by following formula (V), a compound represented by following formula (VI), and a compound represented by following formula (VII).

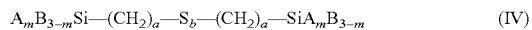

$$A_m B_{3-m} Si-(CH_2)_a-S_b-(CH_2)_a-Si A_m B_{3-m} \qquad (IV)$$

In formula (IV), "A" represents $C_n H_{2n+1} O$ ("n" represents integer in the range of 1 to 3) or chlorine atom, "B" represents $C_{1-3}$ alkyl group, "m" represents integer in the range of 1 to 3, "a" represents integer in the range of 1 to 9, and "b" represents integer equal to or larger than 1. When m=1, "B"s may be of the same type or different types. When m=2 or 3, "A"s may be of the same type or different types.

$$A_m B_{3-m} Si-(CH_2)_c-Y \qquad (V)$$

In formula (V), "A" represents $C_n H_{2n+1} O$ ("n" represents integer in the range of 1 to 3) or chlorine atom, "B" represents $C_{1-3}$ alkyl group, "Y" represents mercapto, vinyl, amino, glycidoxy or epoxy group, "m" represents integer in the range of 1 to 3, and "c" represents integer in the range of 1 to 9. When m=1, "B"s may be of the same type or different types. When m=2 or 3, "A"s may be of the same type or different types.

$$A_m B_{3-m} Si-(CH_2)_a-S_b-Z \qquad (VI)$$

In formula (VI), "A" represents $C_n H_{2n+1} O$ ("n" represents integer in the range of 1 to 3) or chlorine atom, "B" represents $C_{1-3}$ alkyl group, "Z" represents benzothiazoryl, N,N-dimethylthiocarbamoyl or methacryloyl group, "m" represents integer in the range of 1 to 3, "a" represents integer in the range of 1 to 9, and "b" represents integer equal to or larger than 1 and may have a specific distribution. When m=1, "B"s may be of the same type or different types. When m=2 or 3, "A"s may be of the same type or different types.

$$R^1_x R^2_y R^3_z Si-R^4-S-CO-R^5 \qquad (VII)$$

In formula (VII), "R¹" is selected from the group consisting of $R^6O-$, $R^6C(=O)O-$, $R^6R^7C=NO-$, $R^6R^7NO-$, $R^6R^7N-$, and $-(OSiR^6R^7)_n(OSiR^5R^6R^7)$ and the number of carbon atoms of $R^1$ is in the range of 1 to 18 (provided that $R^6$ and $R^7$ are independently selected from the group consisting of alkyl, cycloalkyl, alkenyl, cycloalkenyl and aryl groups, the number of carbon atoms of $R^6$ and $R^7$ is in the range of 1 to 18, "n" is an integer in the range of 0 to 10); "R²" is selected from $C_{1-18}$ alkyl, $C_{1-18}$ cycloalkyl, $C_{1-18}$ alkenyl, $C_{1-18}$ cycloalkenyl and $C_{1-18}$ aryl groups; "R³" is selected from $-[O(R^8O)_m]_{0.5}-$ (provided that $R_8$ is selected from $C_{1-18}$ alkylene group and $C_{1-18}$ cycloalkylene group and "m" represents integer in the range of 1 to 4); x, y and z satisfy equations including x+y+2z=3, 0≤x≤3, 0≤y≤2, and 0≤z≤1; "R⁴" is selected from $C_{1-18}$ alkylene, $C_{1-18}$ cycloalkylene, $C_{1-18}$ cycloalkylalkylene, $C_{1-18}$ alkenylene, $C_{1-18}$ arylene, and $C_{1-18}$ aralkylene groups; and "R⁵" is selected from $C_{1-18}$ alkyl, $C_{1-18}$ cycloalkyl, $C_{1-18}$ alkenyl, $C_{1-18}$ cycloalkenyl, $C_{1-18}$ aryl, and $C_{1-18}$ aralkyl groups.

0 to 80 parts by mass of carbon black may further be blended with 100 parts by mass of the rubber component so that the total content of the hydrated silica and the carbon black is equal to or less than 120 parts by mass.

A pneumatic tire of the present invention is characterized in that the aforementioned rubber composition is applied to a component member thereof.

Advantageous Effect of the Invention

The rubber composition of the present invention is blended with hydrated silica having specific physical properties involving configurations of micropores with openings formed at the outer surface of each particle of the hydrated silica. Accordingly, a tire using the rubber composition can exhibit excellent rolling resistance properties and excellent wear resistance in a compatible manner. That is, a high-performance pneumatic tire can be realized by applying the rubber composition to a component member of the tire.

DESCRIPTION OF THE EMBODIMENTS

Figure 1:
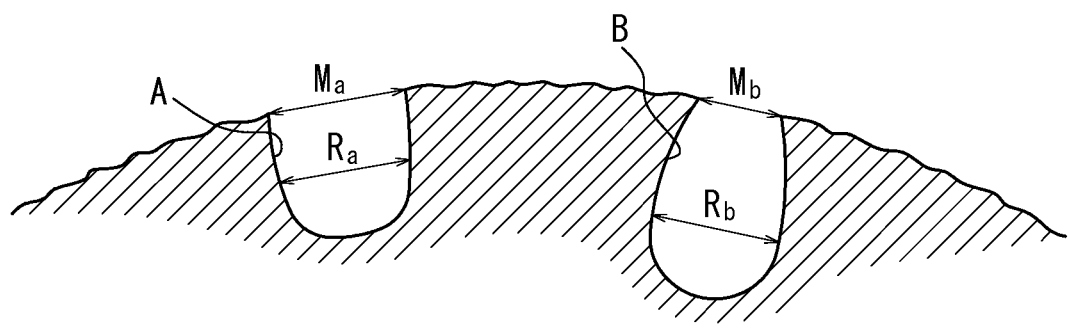
FIG. 1 is a cross-sectional (and partly enlarged) view in the radial direction of a particle of hydrated silica of the present invention.

The present invention will be described in detail hereinafter with reference to drawings according to necessity.

A rubber composition according to a first aspect of the present invention, comprises: a rubber component; and a hydrated silica having particles each provided with micropores with openings in the range of 1.2×10⁵ nm to 6 nm formed at outer surface of the particle, wherein in measurement according to a mercury press-in method using a mercury porosimeter of the hydrated silica, provided that: "M1" (nm) represents diameter of the opening exhibiting the maximum value of mercury charge rate when pressure is increased from 1 PSI to 32000 PSI; "M2" (nm) represents diameter of the opening exhibiting the maximum value of mercury discharge rate when pressure is decreased from 32000 PSI to 1 PSI; "IB" represents "ink bottle-shaped micropore index"; IB=M2−M1 ... (X); and "CTAB" ($m^2/g$) represents specific surface area by cetyltrimethylammonium bromide adsorption, IB and CTAB satisfy following formula (I).

$$IB \leq -0.36 \times CTAB + 86.8 \quad (I)$$

A rubber composition according to a second aspect of the present invention, comprises: a rubber component; and a hydrated silica having particles each provided with micropores with openings in the range of $1.2 \times 10^5$ nm to 6 nm formed at outer surface of the particle, wherein in measurement according to a mercury press-in method using a mercury porosimeter of the hydrated silica, provided that: "M1" (nm) represents diameter of the opening exhibiting the maximum value of mercury charge rate when pressure is increased from 1 PSI to 32000 PSI; "M2" (nm) represents diameter of the opening exhibiting the maximum value of mercury discharge rate when pressure is decreased from 32000 PSI to 1 PSI; "IB" represents "ink bottle-shaped micropore index"; IB=M2−M1 ... (X); "CTAB" ($m^2/g$) represents specific surface area by cetyltrimethylammonium bromide adsorption; "weight loss on ignition" (mass %) represents weight loss when the hydrated silica is heated at 750° C. for 3 hours; and "weight loss on heating" (mass %) represents weight loss when the hydrated silica is heated at 105° C. for 2 hours, IB and CTAB satisfy following formula (I') and formula (II) and "weight loss on ignition" and "weight loss on heating" satisfy formula (III).

$$IB \leq -0.56 \times CTAB + 110.4 \text{ (when CTAB} \leq 140) \quad (I')$$

$$IB \leq -0.20 \times CTAB + 60.0 \text{ (when CTAB} > 140) \quad (II)$$

("weight loss on ignition"−"weight loss on heating")
$\geq 2.5$ (mass %) \quad (III)

Natural rubber or/and diene-based synthetic rubber may be used either solely or in combination as rubber component(s) of the rubber composition of the present invention. Examples of the diene-based synthetic rubber include polyisoprene rubber (IR), styrene-butadiene copolymer rubber (SBR), polybutadiene rubber (BR), and the like. Styrene-butadiene copolymer rubber (SBR) is preferable among these examples. These types of diene-based synthetic rubbers may be used either solely or as a blend of two or more.

"Specific surface area by cetyltrimethylammonium bromide adsorption" (CTAB) ($m^2/g$) represents a value measured according to ASTM D3765-92 in the present invention. It should be noted, however, that ASTM D3765-92 is basically a method for measuring CTAB of carbon black and therefore the present invention specifically includes: preparing cetyltrimethylammonium bromide (which will be referred to as "CE-TRAB" hereinafter) standard solution in place of "IRB#3" (83.0 $m^2/g$) as the standard solution according to ASTM D3765-92; carrying out standardization of hydrated silica OT (sodium di-2-ethylhexyl sulfosuccinate) solution by using the CE-TRAB standard solution; assuming that cross sectional area per one CE-TRAB molecule adsorbed on the hydrated silica surface is 0.35 $nm^2$; and regarding a specific surface area ($m^2/g$) calculated from an amount of CE-TRAB adsorption based on the aforementioned assumption as a value of CTAB. The aforementioned specific steps are required in the present invention because carbon black and hydrated silica, having different surface characteristics therebetween, presumably exhibit difference in amount of CE-TRAB adsorption, as well, even if they share the same surface area.

Further, in the present invention, "ink bottle-shaped micropore index" (IB) is defined by the following formula $$IB = M2 - M1 \quad (X)$$

provided, in measurement according to a mercury press-in method using a mercury porosimeter of a hydrated silica, that: the hydrated silica has particles each provided with micropores with openings in the range of $1.2 \times 10^5$ nm to 6 nm formed at outer surface of the particle; "M1" (nm) represents diameter of the opening exhibiting the maximum value of mercury charge rate when pressure is increased from 1 PSI to 32000 PSI; and "M2" (nm) represents diameter of the opening exhibiting the maximum value of mercury discharge rate when pressure is decreased from 32000 PSI to 1 PSI. Measurement using a mercury porosimeter according to a mercury press-in method is useful because it is not only simpler and easier than measurement using an electron microscope often employed in the prior art in evaluation of micropore morphology but also excellent in quantitativity.

In general, particles of hydrated silica are each provided with a number of micropores as recessed portions with openings formed at outer surface of the particle. FIG. 1 shows a schematic view of configurations of such micropores as described above at a cross section in the radial direction of a particle of hydrated silica. Micropores seen as recessed portions at a cross section in the radial direction of a hydrated silica particle have various shapes. For example, type A micropore has a configuration in which diameter $M_a$ of an opening portion at the outer surface of a particle is substantially equal to micropore diameter at the interior of the particle (the inner diameter) $R_a$, i.e. a substantially cylindrical configuration, at a cross section in the radial direction of the particle. On the other hand, type B micropore has a configuration in which diameter $M_b$ of an opening portion at the outer surface of a particle is smaller than micropore diameter at the interior of the particle (the inner diameter) $R_b$, i.e. an ink bottle-like configuration, at a cross section in the radial direction of the particle. In a case of type B micropore having an ink bottle-shaped configuration at a cross section in the radial direction of a particle of hydrated silicon, molecular chains of rubber do not smoothly enter the micropore from the outer surface toward the interior of the particle and molecular chains of rubber fail to be sufficiently adsorbed when the hydrated silicon is blended with a rubber component, whereby rolling resistance properties of a resulting tire may deteriorate and improvement of wear resistance of the tire may be disturbed due to an insufficient reinforcing effect by the hydrated silica. In other words, entry of rubber molecular chains is efficiently facilitated and thus a sufficient reinforcing effect of the hydrated silica can be demonstrated to contribute to improvement of wear resistance of a tire without deteriorating rolling resistance properties thereof by decreasing the number of ink bottle-shaped type B micropores and increasing the number of substantially cylindrical type A micropores of hydrated silica particles.

In view of this, the aforementioned "ink bottle-shaped micropore index" (IB) regarding hydrated silica to be blended with a rubber component is specified as described above in order to decrease the number of type B micropores having ink bottle-shaped configurations in a cross section in the radial direction of a hydrated silica particle in the present invention. In the measurement using a mercury porosimeter according to a mercury press-in method described above, mercury is relatively easily charged into the inner portion of type A micropore having substantially cylindrical configuration when pressure is increased because an opening thereof formed at the outer surface of a particle is widely open to the exterior, while mercury is less easily charged into the inner portion of type B micropore having ink bottle-shaped configuration than in type A micropore when pressure is increased because an opening of type B micropore formed at the outer surface of a particle is less opened to the exterior than that of type A micropore. On the other hand, mercury is relatively easily discharged from the inner portion of type A micropore having substantially cylindrical configuration toward the exterior of the micropore when pressure is decreased, while mercury is less easily discharged from the inner portion of type B micropore having ink bottle-shaped configuration toward the exterior of the micropore when pressure is decreased for the same reasons as described above.

Figure 2:
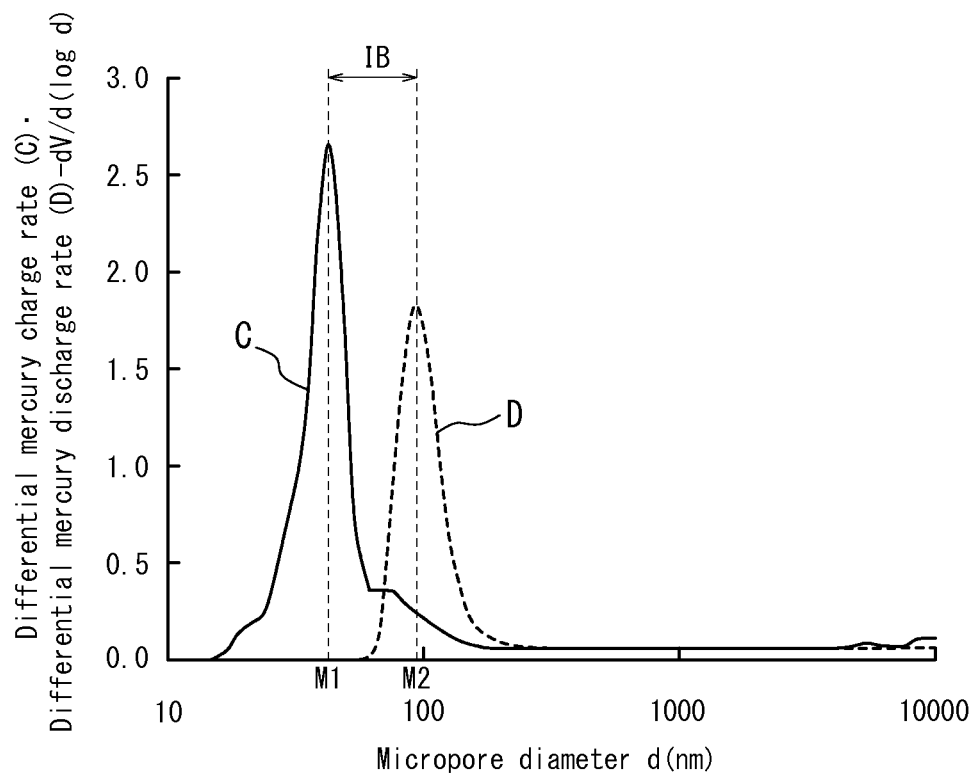
FIG. 2 is a graph schematically showing charge and discharge curves of mercury into/from the hydrated silica in measurement according to a mercury press-in method using a mercury porosimeter. The Y-axis of the graph represents differential mercury charge rate (−dV/d(log d)) in the mercury charge curve C and differential mercury discharge rate (−dV/d(log d)) in the mercury discharge curve D. "V" represents an amount of charged mercury (cc) in the mercury charge curve C and an amount of discharged mercury (cc) in the mercury discharge curve D. The X axis of the graph represents "d" (nm) as diameter (nm) of an opening of a micropore of a particle of the hydrated silica.

Accordingly, there is generated hysteresis in mercury charge and discharge curves C, D in measurement according to a mercury press-in method using a mercury porosimeter, as shown in FIG. 2. Specifically, mercury is readily charged into type A micropores having substantially cylindrical configurations at relatively low pressure and then, when pressure has reached a certain value, mercury bursts into other micropores than type A micropores, such as type B micropores having ink bottle-shaped configurations, which are less accessible for mercury than type A micropores. As a result, charge rate rapidly increases and mercury charge curve C as shown in FIG. 2 is plotted when the Y-axis of the graph represents differential mercury charge rate ($-dV/d(\log d)$) and the X-axis of the graph represents diameter M (nm) of an opening of a micropore of a particle of hydrated silica. On the other hand, when pressure is decreased after having been sufficiently increased, a state where mercury is not easily discharged is maintained under relatively high pressure and, when pressure has dropped to a certain value, mercury charged in micropores bursts into the exterior of the micropores. As a result, discharge rate rapidly increases and mercury discharge curve D as shown in FIG. 2 is plotted when the Y-axis of the graph represents differential mercury discharge rate ($-dV/d(\log d)$) and the X-axis of the graph represents diameter M (nm) of an opening of a micropore of a particle of the hydrated silica. Mercury once charged into micropores tends to remain in a state where it is not easily discharged when pressure decreases, whereby increase in discharge rate is observed, when pressure decreases, at a position in the graph corresponding to a diameter (M2) larger than a diameter (M1) at which increase in charge rage occurs when pressure increases. "IB" shown in FIG. 2 corresponds to difference in these two diameters, i.e. (M2–M1). The tendency that mercury once charged in micropores is not easily discharged is conspicuous in type B micropores having ink bottle-shaped configurations in particular. Mercury charged in type B micropores at certain high pressure is then hardly discharged toward the exterior of the micropores at the same certain high pressure when pressure is decreased.

IB as difference between M1 and M2, determined according to the aforementioned formula (X) by employing the aforementioned measuring method and utilizing mercury charge and discharge curves C, D plotted based on characteristics of micropores, provided that: "M1" (nm) represents diameter of the opening exhibiting the maximum value of mercury charge rate when pressure is increased from 1 PSI to 32000 PSI in measurement using a mercury porosimeter according to a mercury press-in method; and "M2" (nm) represents diameter of the opening exhibiting the maximum value of mercury discharge rate when pressure is decreased from 32000 PSI to 1 PSI in the measurement, thus substantially represents a micropore index indicating presence ratio of type B micropores having ink bottle-shaped configurations present in hydrated silica, although IB apparently is difference in diameter (length: nm) between M1 and M2. Specifically, the smaller presence ratio of type B micropores having ink bottle-shaped configurations with sufficiently narrow openings results in the smaller difference between the mercury charge curve C and the mercury discharge curve D, i.e. the smaller IB value due to the smaller difference between the diameter (M1) of the opening exhibiting the maximum value of mercury charge rate and the diameter (M2) of the opening exhibiting the maximum value of mercury discharge rate. In contrast, the larger presence ratio of type B micropores having ink bottle-shaped configurations results in the larger difference between the mercury charge curve C and the mercury discharge curve D, i.e. the larger IB value due to the larger difference between the diameter (M1) of the opening exhibiting the maximum value of mercury charge rate and the diameter (M2) of the opening exhibiting the maximum value of mercury discharge rate.

IB described above characteristically changes in accordance with the aforementioned CTAB. IB tends to decrease as CTAB increases. Accordingly, the hydrated silica for use in the first aspect of the present invention is to satisfy the following formula (I).

$$IB \leq -0.36 \times CTAB + 86.8 \qquad (I)$$

Hydrated silica, of which IB and CTAB satisfy formula (I) described above, has the effectively reduced number of type B micropores having ink bottle-shaped configurations with narrow openings, as well as a relatively large presence ratio of type A micropores having substantially cylindrical configurations, whereby rubber molecular chains can sufficiently enter micropores of the hydrated silica and be adsorbed therein to cause a satisfactory reinforcing effect, which makes it possible to improve wear resistance of a tire without deteriorating rolling resistance properties thereof.

Further, the hydrated silica for use in the second aspect of the present invention is to satisfy the following formulae (I') when CTAB≤140 and (II) when CTAB>140;

$$IB \leq -0.56 \times CTAB + 110.4 \text{ (when CTAB} \leq 140) \qquad (I')$$

$$IB \leq -0.20 \times CTAB + 60.0 \text{ (when CTAB} > 140) \qquad (II)$$

and preferably satisfies the following formulae (I'-1) when CTAB≤140 and (II-1) when CTAB>140;

$$IB \leq -0.48 \times CTAB + 97.2 \text{ (when CTAB} \leq 140) \qquad (I'-1)$$

$$IB \leq -0.20 \times CTAB + 58.0 \text{ (when CTAB} > 140) \qquad (II-1).$$

Hydrated silica, of which IB and CTAB satisfy formula (I') and (II), preferably formula (I'-1) and (II-1), has the effectively reduced number of type B micropores having ink bottle-shaped configurations with narrow openings, as well as a relatively large presence ratio of type A micropores having substantially cylindrical configurations, whereby rubber molecular chains can sufficiently enter micropores of the hydrated silica and be adsorbed therein to cause a satisfactory reinforcing effect, which makes it possible to improve wear resistance of a tire without deteriorating rolling resistance properties thereof.

The aforementioned hydrated silica exhibits specific surface area by cetyltrimethylammonium bromide adsorption (CTAB) preferably in the range of 50 $m^2/g$ to 300 $m^2/g$ and more preferably in the range of 90 $m^2/g$ to 220 $m^2/g$. CTAB less than 50 $m^2/g$ may significantly deteriorate wear resistance of a resulting tire. CTAB exceeding 300 $m^2/g$ does not allow the hydrated silica to be sufficiently dispersed in the rubber component, thereby possibly significantly deteriorating workability of rubber and thus physical properties such as wear resistance of a resulting tire.

The hydrated silica of the second aspect of the present invention satisfies formulae (I') and (II) described above and, provided that "weight loss on ignition" (mass %) represents weight loss when the hydrated silica is heated at 750° C. for 3 hours and "weight loss on heating" (mass %) represents weight loss when the hydrated silica is heated at 105° C. for 2 hours, is to further satisfy the following formula (III);

("weight loss on ignition"–"weight loss on heating")
≥2.5 (mass %)          (III)

and preferably further satisfy the following formula (III-1);

("weight loss on ignition"–"weight loss on heating")
≥3.0 (mass %)          (III-1).

The aforementioned ("weight loss on ignition"–"weight loss on heating") represents a density index of silanol group present at surfaces of hydrated silica. Hydrated silica satisfying formula (III), as well as formulae (I) and (II), significantly contributes to achieving good balance between rolling resistance and wear resistance in a resulting tire through good interaction between the hydrated silica and rubber molecular chains.

Preferably 10 to 150 parts by mass, more preferably 30 to 100 parts by mass, of the hydrated silica may be blended with 100 parts by mass of the rubber component. Content of the hydrated silica less than 10 parts by mass (pbm) may adversely affect low-heat generation properties of the rubber composition. Content of the hydrated silica exceeding 150 pbm may deteriorate workability of rubber and wear resistance of a tire obtained from the rubber.

1 to 20 pbm, preferably 3 to 16 pbm, and more preferably 5 to 12 pbm, of silane coupling agent may be blended with 100 pbm of the hydrated silica in the rubber composition of the present invention. Silane coupling agent blended by at least 1 pbm with 100 pbm of the hydrated silica further improves an effect caused by the hydrated silica blending and results in better low-heat generation properties and storage modulus of the rubber composition. In this regard, content of silane coupling agent exceeding 20 pbm with respect to 100 pbm of the hydrated silica can no longer contribute to improving low-heat generation properties and storage modulus of the rubber composition but may meaninglessly increase production cost.

The silane coupling agent is preferably a compound selected from:

a compound represented by following formula (IV)

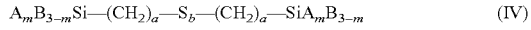
$$A_mB_{3-m}Si—(CH_2)_a—S_b—(CH_2)_a—SiA_mB_{3-m} \quad (IV)$$

(in formula (IV), "A", "B", "m", "a" and "b" are defined as described above);

a compound represented by following formula (V)

$$A_mB_{3-m}Si—(CH_2)_c—Y \quad (V)$$

(in formula (V), "A", "B", "Y", "m" and "c" are defined as described above);

a compound represented by following formula (VI)

$$A_mB_{3-m}Si—(CH_2)_a—S_b—Z \quad (VI)$$

(in formula (VI), "A", "B", "Z", "m", "a" and "b" are defined as described above); and a compound represented by following formula (VII)

$$R^1{}_xR^2{}_yR^3{}_zSi—R^4—S—CO—R^5 \quad (VII)$$

(in formula (VII), "$R^1$", "$R^2$", "$R^3$", "$R^4$", "$R^5$", "x", "y" and "z" are defined as described above).

The aforementioned types of silane coupling agents may be used either solely or as a blend of two or more.

Examples of the compound represented by formula (IV) described above include bis(3-tiethoxysilylpropyl)tetrasulfide, bis(3-trimethoxysilylpropyl)tetrasulfide, bis(3-methyldimethoxysilylpropyl)tetrasulfide, bis(3-triethoxysilylethyl)tetrasulfide, bis(3-triethoxysilylpropyl)disulfide, bis(3-trimethoxysilylpropyl)disulfide, bis(3-triethoxysilylpropyl) trisulfide, and the like.

Examples of the compound represented by formula (V) described above include 3-mercaptopropyl trimethoxysilane, 3-mercaptopropyl triethoxysilane, vinyltriethoxysilane, vinyltrimethoxysilane, 3-aminopropyltriethoxysilane, 3-aminopropyltrimethoxysilane, (3-mercaptopropyl)methyldimethoxysilane, γ-glycidoxypropyltrimethoxysilane, γ-glycidoxypropylmethyldiethoxysilane, and the like. Examples of commercially available products of these compounds include "VP Si363" manufactured by Evoik Degussa Corporation.

Examples of the compound represented by formula (VI) described above include 3-trimethoxysilylpropyl-N,N-dimethylcarbamoyl tetrasulfide, 3-trimethoxysilylpropylbenzothiazolyl tetrasulfide, 3-trimethoxysilylpropyl-methacryloyl monosulfide, and the like.

Regarding $R^2$, $R^5$, $R^6$ and $R^7$ of the compound represented by formula (VII) described above, the alkyl group may be either normal or branched and examples thereof include methyl, ethyl, propyl, isopropyl group, and the like. The alkenyl group may be either normal or branched and examples thereof include vinyl, allyl, methanyl group, and the like. Examples of the cycloalkyl group include cyclohexyl, ethylcyclohexyl group, and the like. Examples of the cycloalkenyl group include cyclohexenyl, ethylcyclohexenyl group, and the like. Examples of the aryl group include phenyl, tolyl group, and the like. Examples of the aralkyl group in $R^5$ include phenethyl group and the like.

Regarding $R^4$ and $R^8$ of the compound represented by formula (VII), the alkylene group may be either normal or branched and examples thereof include methylene, ethylene, trimethylene, propylene group, and the like. Examples of the cycloalkylene group include cyclohexylene and the like. The alkenylene group in $R^4$ may be either normal or branched and examples thereof include vinylene, propenylene group, and the like. Examples of the cycloalkylalkylene group include cyclohexylmethylene group and the like. Examples of the arylene group include phenylene group and the like. Examples of the aralkylene group include xylylene group and the like.

Examples of the —[O($R^8$O)$_m$]$_{0.5}$— group in $R^3$ of formula (VII) include 1,2-ethane dioxy, 1,3-propane dioxy, 1,4-buthane dioxy, 1,5-pentane dioxy, 1,6-hexane dioxy group, and the like.

The compound represented by formula (VII) can be synthesized in a method similar to the method described in JP-A 2001-505225. Alternatively, a commercially available product such as "NXT" (3-octanoyl-thiopropyltriethoxysilane as the compound represented by formula (VII) where $R^1$=$C_2H_5O$, $R^4$=$C_3H_6$, $R^5$=$C_7H_{15}$, x=3, y=0, z=0, manufactured by Momentive Performance Materials Inc.) may be used.

The compound represented by formula (V) or the compound represented by formula (VII) is preferable among the compounds represented by formulae (IV), (V), (VI) and (VII).

Further, it is possible to use as the silane coupling agent an organic silicon compound having in molecule thereof: a ring structure including nitrogen atom (N) and silicon atom (Si); at least one sulfur atom (S); and at least one group causing relatively little steric hindrance bonded to the silicon atom (Si). The ring structure including nitrogen atom (N) and silicon atom (Si) of the organic silicate compound is stable even when the ring structure has a silicon-oxygen bond (Si—O). Accordingly, an alcohol component is prevented from being generated due to hydrolysis of silicon-oxygen bond (Si—O) and thus generation of volatile organic compound (VOC) gas during use can be reduced.

The aforementioned organic silicon compound, having a nitrogen-containing functional group such as amino, imino, substituted amino, substituted imino group exhibiting high affinity with a surface of an organic filler like silica, is reacted with an organic filler through the unshared electron pair of nitrogen atom and exhibits relatively high rate of a coupling reaction. In this regard, if the ring structure including nitrogen atom (N) and silicon atom (Si) of the organic silicate compound is bycyclic, steric hindrance around silicon atom (Si) is relatively severe, whereby reactivity of the organic silicon compound with an inorganic filler decreases and coupling efficiency significantly drops. However, the organic silicon compound for use in the present invention, having sites where at least one group causing relatively little steric hindrance is bonded to the silicon atom (Si), is readily reacted with an inorganic filler such as silica. Accordingly, coupling efficiency improves and thus wear resistance of a tire can be significantly improved with significantly reducing hysteresis loss of the rubber composition by adding, instead of the conventional silane coupling agent, the aforementioned organic silicon compound to the rubber composition blended with an inorganic filler. Further, the organic silicon compound of the present invention, which efficiently works when it is added to the rubber composition, can cause a good effect by a relatively small amount and contributes to cost reduction, as well.

Preferable examples of the group causing relatively little steric hindrance include hydrogen atom (—H), methyl group (—CH$_3$), hydroxyl group (—OH), and the like. In a case where hydrogen atom, methyl group or hydroxyl group is bonded to silicon atom (Si), the organic silicon compound is particularly well reacted with an inorganic filler and therefore can significantly improve coupling efficiency. The organic silicon compound preferably has one to six silicon-oxygen bonds (Si—O) therein because reactivity of the organic silicon compound with an inorganic filler such as silica is then sufficiently high and coupling efficiency further improves.

Specifically, a compound represented by the following general formula (XI) is preferable as the organic silicon compound for use in the present invention. Either one type or plural types in combination of the organic silicon compound may be used in the present invention.

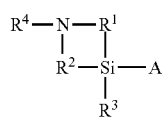

(XI)

In formula (XI), "A" represents a group containing sulfur atom (S) and reactive with a rubber component, "$R^1$" and "$R^2$" each independently represent -M-C$_l$H$_{2l}$— ("M" represents —O— or —CH$_2$—, "l" is an integer in the range of 0 to 10), at least one of $R^1$ and $R^2$ has —O— as M, "$R^3$" represents hydrogen atom, methyl group or hydroxyl group, "$R^4$" represents —C$_n$H$_{2n+1}$—, and "n" is an integer in the range of 0 to 20.

In formula (XI), "A" represents a group containing sulfur atom (S) and reactive with a rubber component. The organic silicon compound represented by formula (XI) further includes in a molecule thereof a group reactive with a rubber component, as well as the ring structure portion reactive with an inorganic filler such as silica, thereby having capacity of coupling the rubber component with the inorganic filler. The group containing sulfur atom (S) and reactive with a rubber component preferably includes at least one type of group selected from the group consisting of polysulfide, thioester, thiol, dithiocarbonate, dithioacetal, hemithioacetal, vinyltho, α-thiocarbonyl, β-thiocarbonyl, S—CO—CH$_2$—O portion, S—CO—CO portion (thio-diketone), and S—CH$_2$—Si portion. It is particularly preferable that the group containing sulfur atom (S) and reactive with a rubber component includes at least one of polysulfide group and thioester group.

In formula (XI), $R^1$ and $R^2$ each independently represent -M-C$_l$H$_{2l}$—, wherein "M" represents —O— or —CH$_2$—, "l" is an integer in the range of 0 to 10, and at least one of $R^1$ and $R^2$ has —O— as M. "—C$_l$H$_{2l}$" represents a single bond or a C$_{1-10}$ alkylene group because "l" is in the range of 0 to 10. Examples of the C$_{1-10}$ alkylene group include methylene, ethylene, trimethylene, propylene group, and the like. The alkylene group may be either normal or branched.

In formula (XI), $R^3$ represents hydrogen atom, methyl group or hydroxyl group. Said $R^3$, causing relatively little steric hindrance, makes significant contribution to improving a coupling reaction between a rubber component and an inorganic filler.

In formula (XI), $R^4$ represents —C$_n$H$_{2n+1}$, wherein "n" is an integer in the range of 0 to 20. "—C$_n$H$_{2n+1}$" represents hydrogen or a C$_{1-20}$ alkyl group because "n" is in the range of 0 to 20. Examples of the C$_{1-20}$ alkyl group include methy, ethyl, propyl, butyl, pentyl, hexyl, octyl, decyl, undecyl, dodecyl, nonadecyl, eicosyl group, and the like. The alkyl group may be either normal or branched.

"A" in the aforementioned formula (XI) is preferably represented by the following formula (XII), formula (XIII) or formula (XIV).

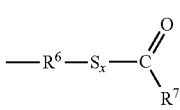

(XII)

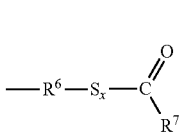

(XIII)

$R^1$, $R^2$, $R^3$ and $R^4$ in formula (XII) are each defined as described above and $R^6$ in formulae (XII) and (XIII) is represented by either -M-C$_l$H$_{2l}$("M" and "l" are defined as described above, respectively) or the following formula (XV) or formula (XVI).

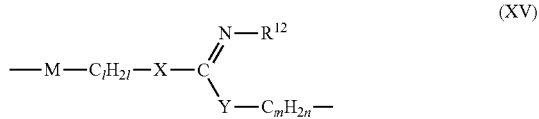

(XV)

(XVI)

In formulae (XV) and (XVI), "M" and "l" are each defined as described above, "m" is an integer in the range of 0 to 10, "X" and "Y" each independently represent —O—, —NR$^4$— or —CH$_2$—, "R$^{12}$" represents —OR$^4$, —NR$^4$R$^6$ or —R$^4$, "R$^{13}$" represents —NR$^4$—, —NR$^4$—NR$^4$— or —N=N—, provided that R$^4$ is defined as described above, R$^5$ represents C$_q$H$_{2q+1}$, and "q" is an integer in the range of 1 to 10.

"R$^7$" in formula (XIII) is preferably represented by the following formula (XVII) or formula (XVIII).

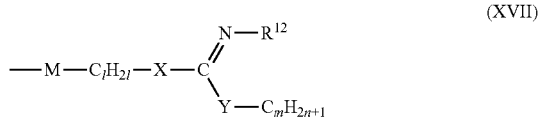

(XVII)

(XVIII)

In formulae (XVII) and (XVIII), "M", "X", "Y", R$^{13(12)}$, "l" and "m" are defined as described above. In formula (XVIII), R$^{14}$ represents —NR$^4$R$^5$, —NR$^4$NR$^4$R$^6$, —N=NR$^4$, or —C$_l$H$_{2l}$R$^{15}$ (R$^{15}$ represents —NR$^4$R$^5$, —NR$^4$—NR$^4$R$^5$, —N=NR$^4$, -M-C$_m$H$_{2m+1}$—, or a C$_{6-20}$ aromatic hydrocarbon group), provided that R$^4$, R$^5$, "M", "l" and "m" are defined as described above.

In formulae (XII) and (XIII), "x" represents an integer in the range of 1 to 10 and preferably in the range of 2 to 4.

R$^8$, R$^9$ and R$^{10}$ in formula (XIV) each independently represent -M-C$_p$H$_{2p}$("M" represents —O— or —CH$_2$—, "p" represents an integer in the range of 0 to 20). R$^{11}$ represents H, OH or methyl group.

In formulae (XV) and (XVI), "M" represents —O— or —CH$_2$—; and "l" and "m" each represent an integer in the range of 0 to 10. In formula (XV), "X" and "Y" each independently represent —O—, —NR$^4$— or —CH$_2$—, R$^{12}$ represents —OR$^4$, —NR$^4$R$^5$ or —R$^4$ (R$^4$ represents C$_n$H$_{2n+1}$), and R$^6$ represents C$_q$H$_{2q+1}$. Further, in formulae (XVI), R$^{13}$ represents —NR$^4$—, —NR$^4$—NR$^4$—, or —N=N— (R$^4$ represents —C$_n$H$_{2n+1}$).

"—C$_n$H$_{2n+1}$" is defined as described above. "—C$_m$H$_{2m}$—" represents a single bond or a C$_{1-10}$ alkylene group because "m" is an integer in the range of 0 to 10. Examples of the C$_{1-10}$ alkylene group include methylene, ethylene, trimethylene, propylene group, and the like. The C$_{1-10}$ alkylene group may be either normal or branched.

"—C$_q$H$_{2q+1}$" represents hydrogen or a C$_{1-10}$ alkyl group because "q" is an integer in the range of 0 to 10. Examples of the C$_{1-10}$ alkyl group include methy, ethyl, propyl, butyl, pentyl, hexyl, heptyl, octyl, decyl, and the like. The alkyl group may be either normal or branched.

R$^7$ in formula (XIII) represents formula (XVII), formula (XVIII), or —C$_l$H$_{2l}$R$^{16}$, preferably —C$_l$H$_{2l+1}$, provided that "M", "X", "Y", R$^{12}$, R$^{14}$, "l" and "m" are defined as described above. R$^{15}$ represents —NR$^4$R$^5$, —NR$^4$N$^4$R$^5$, —N=NR$^4$, -M-C$_m$H$_{2m+1}$, or a C$_{6-20}$ aromatic hydrocarbon group, provided that R$^4$, R$^5$, "M", "l" and "m" are defined as described above.

"—C$_l$H$_{2l}$—" is defined as described above. "—C$_m$H$_{2m+1}$" represents hydrogen or a C$_{1-10}$ alkyl group because "m" is an integer in the range of 0 to 10. Examples of the C$_{1-10}$ alkyl group include methy, ethyl, propyl, butyl, pentyl, hexyl, heptyl, octyl, decyl, and the like. The alkyl group may be either normal or branched. Examples of the C$_{6-20}$ aromatic hydrocarbon group include: aryl group such as phenyl, tolyl, xylyl, cumenyl, naphthylene, tolylene group; and aralkyl group such as benzyl and phenethyl.

"—C$_p$H$_{2p+1}$—" in formula (XIV) represents a single bond or a C$_{1-20}$ alkylene group because "p" is an integer in the range of 0 to 20. Examples of the C$_{1-20}$ alkylene group include methylene, ethylene, trimethylene, propylene, decamethylene, eicosamethylene group, and the like. The C$_{1-20}$ alkylene group may be either normal or branched.

"M" is preferably —O— (oxygen) in the compound represented by formula (XI) because the compound having —O— as M is more readily reacted with an inorganic filler such as silica than a corresponding compound having —CH$_2$— as M.

In formula (XI), R$^1$ and R$^2$ preferably each independently represent —O—C$_l$H$_{2l}$—, R$^3$ represents hydrogen, methyl, or hydroxyl group, R$^6$ preferably represents —O—C$_l$H$_{2l}$—, and R$^7$ preferably represents either a normal or branched alkyl group represented by —O—C$_l$H$_{2l}$— or a C$_{6-20}$ aromatic hydrocarbon group.

The aforementioned organic silicon compound can be synthesized, for example, by: preparing a compound represented by a chemical formula (C$_l$H$_{2l+1}$O)$_2$R$^{9(3)}$Si-A ("l", R$^3$ and "A" are defined as described above); adding an amine compound such as N-methyldiethanolamine, N-ethyldiethanolamine or the like, as well as catalyst like an acid such as p-toluenesulfonic acid, hydrochloric acid and/or titanium alkoxide such as titanium (IV) n-butoxide, to the compound thus prepared; and heating the mixture such that the two C$_l$H$_{2l+1}$O— groups are substituted with a divalent group represented by —R$^1$—NR$^4$—R$^2$—.

The aforementioned organic silicon compound has a ring structure including nitrogen atom (N) and silicon atom (Si), and this ring structure is stable even when the ring structure has a silicon-oxygen bond (Si—O). Accordingly, an alcohol component is reliably prevented from being generated due to hydrolysis of silicon-oxygen bond (Si—O) and thus generation of volatile organic compound (VOC) gas during use can be effectively reduced.

The rubber composition of the present invention may be further blended with carbon black as reinforcing filler. Content of carbon black is to be 80 parts by mass (pbm) or less and preferably 60 pbm or less with respect to 100 pbm of the rubber composition. Content of carbon black exceeding 80 pbm with respect to 100 pbm of the rubber composition may deteriorate low-heat generation properties of the rubber composition. Further, the total content of the carbon black and the hydrated silica is to be 120 pbm or less, preferably 100 pbm or less, with respect to 100 pbm of the rubber composition. Low-heat generation properties of the rubber composition is satisfactorily realized and rolling resistance properties can be sufficiently improved by setting the total content of the carbon black and the hydrated silica to be 120 pbm or less with respect to 100 pbm of the rubber composition.

The rubber composition of the present invention may be blended with additives conventionally added to a rubber composition unless addition thereof adversely affects good effects of the present invention. For example, the rubber composition may be appropriately blended with additives such as antioxidant, vulcanization accelerator, sulfur, zinc oxide, stearic acid, antiozonant and the like, which are generally used in the rubber industry. The rubber composition of the present invention is obtained by mixing the ingredients with an open-type rubber mixer such as rolls or a closed-type rubber mixer such as Banbury mixer. The rubber composition of the present invention is applicable to various types of rubber products through molding and subsequent vulcanization thereof.

The pneumatic tire of the present invention is characterized in that the aforementioned rubber composition is applied to at least one component member thereof. The rubber composition of the present invention is particularly preferably applied to tread among component members of the tire. The tire using the rubber composition in tread inherently exhibits low rolling resistance and has excellent wear resistance. Examples of gas with which the tire of the present invention is inflated include: air having normal or adjusted oxygen partial pressure; and inert gas such as nitrogen.

EXAMPLES

The present invention will be described further in detail by Examples hereinafter. The present invention, however, is not restricted by these Examples. Physical properties of hydrated silica were evaluated by the following method.

« Measurement of Ink Bottle-Shaped Micropore Index (IB) »

IB was obtained by: measuring, according to a mercury press-in method using a mercury porosimeter "POREMASTER-33" manufactured by Quantachrome Instrument, mercury charge rate in micropores with openings in the range of $1.2 \times 10^5$ nm to 6 nm formed at outer surfaces of particles of hydrated silica by increasing pressure from 1 PSI to 32000 PSI; determining a diameter (M1) corresponding to the peak of mercury charge rate in mercury charge curve in the graph as shown in FIG. 2; then discharging mercury from the micropores by decreasing pressure from 32000 PSI to 1 PSI and determining a diameter (M2) corresponding to the peak of mercury discharge rate in the mercury discharge curve in the same graph; and calculating difference between M1 and M2.

« Measurement of CTAB »

CTAB was obtained according to the method disclosed in ASTM D3765-92 by: preparing cetyltrimethylammonium bromide (which will be referred to as "CE-TRAB" hereinafter) standard solution in place of "IRB#3" (83.0 $m^2$/g) as the standard solution for carbon black measurement, as described above; carrying out standardization of hydrated silica OT (sodium di-2-ethylhexyl sulfosuccinate) solution by using the CE-TRAB standard solution; assuming that cross sectional area per one CE-TRAB molecule adsorbed on the hydrated silica surface is 0.35 $nm^2$; and regarding a specific surface area ($m^2$/g) calculated from an amount of CE-TRAB adsorption based on the aforementioned assumption as a value of CTAB.

« Measurement of "Weight Loss on Ignition" and "Weight Loss on Heating" »

Samples of hydrated silica were prepared by weighing the hydrated silica. "Weight loss on ignition" (mass %) was determined by measuring decrease in mass after a sample was heated at 750° C. for 3 hours and calculating percentage of the decrease, i.e. difference in sample mass before and after heating, with respect to the sample mass before heating. "Weight loss on heating" (mass %) was determined by measuring decrease in mass after a sample was heated at 105° C. for 2 hours and calculating percentage of the decrease, i.e. difference in sample mass before and after heating, with respect to the sample mass before heating.

Manufacturing Example 1

Manufacture of Hydrated Silica A

65 L of water and 1.25 L of sodium silicate aqueous solution ($SiO_2$: 160 g/L, molar ratio of $SiO_2/Na_2O$: 3.3) were charged into a jacketed stainless reaction vessel (180 L) provided with a stirrer. The mixture solution was heated at 96° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 750 mL/minute and 33 mL/minute, respectively, while temperature of the mixture solution was maintained at 96° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 30 minutes after the start of neutralization. Addition of the sodium silicate aqueous solution and sulfuric acid were continued and the neutralization reaction was stopped 100 minutes after the start of neutralization. Concentration of silica formed in a resulting solution was 85 g/L. The same sulfuric acid as described above was again added to the resulting solution until pH of the solution reached 3, whereby silicate slurry was obtained. The silicate slurry thus obtained was filtrated by a filter press and then rinsed with water, whereby wet cake was obtained. The wet cake thus obtained was rendered into slurry again by using an emulsifier and dried by a spray dryer, whereby wet method-based hydrated silica A was obtained.

Manufacturing Example 2

Manufacture of Hydrated Silica B

89 L of water and 1.70 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 75° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 520 mL/minute and 23 mL/minute, respectively, while temperature of the mixture solution was maintained at 75° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 46 minutes after the start of neutralization. Addition of the sodium silicate aqueous solution and sulfuric acid were continued and the neutralization reaction was stopped 100 minutes after the start of neutralization. Concentration of silica formed in a resulting solution was 60 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica B was obtained.

Manufacturing Example 3

Manufacture of Hydrated Silica C

65 L of water and 1.25 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 85° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 750 mL/minute and 33 mL/minute, respectively, while temperature of the mixture solution was maintained at 85° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 31 minutes after the start of neutralization. Addition of the sodium silicate aqueous solution and sulfuric acid were continued and the neutralization reaction was stopped 100 minutes after the start of neutralization. Concentration of silica formed in a resulting solution was 85 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica C was obtained.

Manufacturing Example 4

Manufacture of Hydrated Silica D

65 L of water and 1.25 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 80° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 750 mL/minute and 33 mL/minute, respectively, while temperature of the mixture solution was maintained at 80° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 31 minutes after the start of neutralization. Addition of the sodium silicate aqueous solution and sulfuric acid were continued and the neutralization reaction was stopped 100 minutes after the start of neutralization. Concentration of silica formed in a resulting solution was 85 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica D was obtained.

Manufacturing Example 5

Manufacture of Hydrated Silica E

89 L of water and 1.70 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 85° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 520 mL/minute and 23 mL/minute, respectively, while temperature of the mixture solution was maintained at 85° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 45 minutes after the start of neutralization. Addition of the sodium silicate aqueous solution and sulfuric acid were continued and the neutralization reaction was stopped 100 minutes after the start of neutralization. Concentration of silica formed in a resulting solution was 60 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica E was obtained.

Manufacturing Example 6

Manufacture of Hydrated Silica F

89 L of water and 1.70 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 80° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 520 mL/minute and 23 mL/minute, respectively, while temperature of the mixture solution was maintained at 80° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 45 minutes after the start of neutralization. Addition of the sodium silicate aqueous solution and sulfuric acid were continued and the neutralization reaction was stopped 100 minutes after the start of neutralization. Concentration of silica formed in a resulting solution was 60 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica F was obtained.

Manufacturing Example 7

Manufacture of Hydrated Silica G

89 L of water and 1.70 L of sodium silicate aqueous solution ($SiO_2$: 160 g/L, molar ratio of $SiO_2/Na_2O$: 3.3) were charged into a stainless reaction vessel of the same type as that in Manufacturing Example 1. The mixture solution was heated at 70° C. Na$_2$O concentration of the mixture solution thus prepared was 0.015 mol/L.

The same sodium silicate aqueous solution as described above and sulfuric acid (18 mol/L) were simultaneously added dropwise to the mixture solution at flow rates of 520 mL/minute and 23 mL/minute, respectively, while temperature of the mixture solution was maintained at 70° C. Neutralization was carried out with maintaining Na$_2$O concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 46 minutes after the start of neutralization. Addition of the sodium silicate aqueous solution and sulfuric acid were continued and the neutralization reaction was stopped 100 minutes after the start of neutralization. Concentration of silica formed in a resulting solution was 60 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica G was obtained.

Comparative Examples 1 to 4, Examples 1 to 7

Rubber compositions using hydrated silicas shown in Table 2 and Table 3 were prepared, respectively, according to the blending prescription of Table 1 by the conventional method, and sample tires having size: 195/65R15 were prepared according to the conventional method by applying the resulting rubber compositions to tread rubbers thereof, respectively. Wear resistance and rolling resistance of each of the sample tires were evaluated according to the methods described below, respectively. The results are shown in Table 2 and Table 3. Value of formula (I) was not studied in Example 7 because the main object of Example 7 was to manufacture a rubber composition blended with a hydrated silica having ink bottle-shaped micropore index (IB) satisfying formula (II).

Comparative Example 5, Examples 8 to 10

Rubber compositions using hydrated silicas shown in Table 5 were prepared, respectively, according to the blending prescription of Table 4 by the conventional method, and sample tires having size: 195/65R15 were prepared according to the conventional method by applying the resulting rubber compositions to tread rubbers thereof, respectively. Wear resistance and rolling resistance of each of the sample tires were evaluated according to the methods described below, respectively. The results are shown in Table 5.

« Wear Resistance »

Wear resistance was evaluated by: mounting each of the sample tires on a vehicle; measuring remaining tread groove depth of the tire after running 20,000 km; and expressing the remaining tread groove depth thus measured, as an index relative to the remaining tread groove depth of Comp. Example 1 (Tables 2 and 3)/Comp. Example 5 (Table 5) being 100. The larger index value represents the better wear resistance.

« Rolling Resistance »

Rolling resistance was evaluated by: mounting each of the sample tires on an indoor drum tester type single-shaft rolling resistance measurement system; measuring rolling resistance when the tire was run at 80 km/hour; and expressing the rolling resistance thus measured, as an index relative to the rolling resistance of Comp. Example 1 (Tables 2 and 3)/Comp. Example 5 (Table 5) being 100. The larger index value represents the lower rolling resistance.

TABLE 1

|  | Content |
|---|---|
| Styrene-butadiene copolymer rubber[\*1] | 100 |
| Carbon black[\*2] | 10 |
| Hydrated silica[\*3] | 75 |
| Silane coupling agent[\*4] | 7 |
| Aromatic oil | 36 |
| Stearic acid | 2 |
| Antioxidant[\*5] | 1 |
| Zinc oxide | 3 |
| Vucanization accelerator A[\*6] | 1 |
| Vucanization accelerator B[\*7] | 1 |
| Vucanization accelerator C[\*8] | 1 |
| Sulfur | 1.5 |

[\*1]"#1500", manufactured by JSR Corporation
[\*2]"SEAST KH ® (N339)", manufactured by Tokai Carbon Co., Ltd.
[\*3]Hydrated silicas shown in Table 2
[\*4]"NXT ®", manufactured by Momentive Performance Material Inc.
[\*5]N-(1,3-dimethylbutyl)-N'-phenyl-p-phenylenediamine, "Nocrac 6C", manufactured by Ouchi Shinko Chemical Industrial Co., Ltd.
[\*6]Diphenylguanidine, "Nocceler D", manufactured by Ouchi Shinko Chemical Industrial Co., Ltd.
[\*7]Benzothiazyl disulfide, "Nocceler DM-P", manufactured by Ouchi Shinko Chemical Industrial Co., Ltd.
[\*8]N-t-butyl-2-benzothiazyl sulfenamide, "Nocceler NS-P", manufactured by Ouchi Shinko Chemical Industrial Co., Ltd.

TABLE 2

|  | Comp. Example 1 | Comp. Example 2 | Comp. Example 3 | Comp. Example 4 |
|---|---|---|---|---|
| Hydrated silica | NipsilAQ[\*9] | VN2[\*10] | U7000GR[\*11] | TOKUSIL255G[\*12] |
| C T A B | 165 | 106 | 153 | 170 |
| Value of formula (I) | 27.40 | 48.64 | 31.72 | 25.6 |
| Value of formula (I') |  | 51.04 |  |  |
| Value of formula (II) | 27.0 |  | 29.4 | 26.0 |
| I B | 34.10 | 58.20 | 34.50 | 31.00 |
| (Weight loss on ignition)-(Weight loss on heating) (mass %) | 2.6 | 2.4 | 2.3 | 2.6 |
|  | Evaluation | | | |
| Wear resistance | 100 | 80 | 98 | 100 |
| Rolling resistance | 100 | 110 | 103 | 99 |

[\*9]"Nipsil AQ", manufactured by Tosoh Silica Corporation
[\*10]"VN2", manufactured by Evoik Degussa Corporation
[\*11]"Ultrasil 7000GR", manufactured by Evoik Degussa Corporation
[\*12]"TOKUSHIL 255G", manufactured by Oriental Silicas Corporation

TABLE 3

|  | Example 1 | Example 2 | Example 3 | Example 4 | Example 5 | Example 6 | Example 7 |
|---|---|---|---|---|---|---|---|
|  | Hydrated silica | | | | | | |
|  | Hydrated silicate A | Hydrated silicate B | Hydrated silicate C | Hydrated silicate D | Hydrated silicate E | Hydrated silicate F | Hydrated silicate G |
| CTAB | 79 | 180 | 105 | 120 | 142 | 165 | 209 |
| Value of formula (I) | 58.00 | 22.00 | 49.00 | 43.60 | 35.68 | 27.40 | — |
| Value of formula (I') | 65.60 |  | 51.60 | 43.20 |  |  |  |
| Value of formula (II) |  | 24.0 |  |  | 31.6 | 27.0 | 18.2 |
| I B | 55.00 | 20.00 | 44.50 | 38.20 | 28.50 | 24.50 | 15.20 |
| (Weight loss on ignition)-(Weight loss on heating) (mass %) | 3.0 | 3.2 | 3.1 | 3.0 | 3.1 | 3.1 | 3.2 |
|  | Evaluation | | | | | | |
| Wear resistance | 99 | 120 | 102 | 108 | 110 | 115 | 121 |
| Rolling resistance | 115 | 102 | 110 | 105 | 104 | 103 | 101 |

TABLE 4

|  | Content |
|---|---|
| Styrene-butadiene copolymer rubber*[1] | 100 |
| Carbon black*[2] | 10 |
| Hydrated silica*[3] | 75 |
| Silane coupling agent*[13] | 7 |
| Aromatic oil | 36 |
| Stearic acid | 2 |
| Antioxidant*[5] | 1 |
| Zinc oxide | 3 |
| Vucanization accelerator A*[6] | 1 |
| Vucanization accelerator B*[7] | 1 |
| Vucanization accelerator C*[8] | 1 |
| Sulfur | 1.5 |

Unit of content in Table 41 is parts by mass.
*[1]"#1500", manufactured by JSR Corporation
*[2]"SEAST KH ® (N339)", manufactured by Tokai Carbon Co., Ltd.
*[3]Hydrated silicas shown in Table 2
*[13]Bis(3-triethoxysilylpropyl)tetrasulfide, "Si69", manufactured by Evoik Degussa Corporation
*[5]N-(1,3-dimethylbutyl)-N'-phenyl-p-phenylenediamine, "Nocrac 6C", manufactured by Ouchi Shinko Chemical Industrial Co., Ltd.
*[6]Diphenylguanidine, "Nocceler D", manufactured by Ouchi Shinko Chemical Industrial Co., Ltd.
*[7]Benzothiazyl disulfide, "Nocceler DM-P", manufactured by Ouchi Shinko Chemical Industrial Co., Ltd.
*[8]N-t-butyl-2-benzothiazyl sulfenamide, "Nocceler NS-P", manufactured by Ouchi Shinko Chemical Industrial Co., Ltd.

It is understood from the results of Tables 2, 3 and 5 that Examples 1 to 7 and 8 to 10 employing the rubber compositions blended with hydrated silicas satisfying formulae (I), (I')/(II) and (III) exhibited excellent rolling resistance properties and excellent wear resistance in a well balanced manner, as compared with Comparative Examples 1 to 5.

REFERENCE SIGNS LIST

A: Micropore having substantially cylindrical configuration
B: Micropore having ink bottle-shaped configuration
$M_a$: Diameter of opening of type A micropore at the outer surface of a particle
$M_b$: Diameter of opening of type B micropore at the outer surface of a particle
$R_a$: Inner diameter of type A micropore at the interior of the particle
$R_b$: Inner diameter of type B micropore at the interior of the particle
C: Mercury charge curve
D: Mercury discharge curve
M1: Diameter of opening exhibiting the maximum value of mercury charge rate when pressure is increased from 1 PSI to 32000 PSI

TABLE 5

|  | Comp. Example 5 | Example 8 | Example 9 | Example 10 |
|---|---|---|---|---|
| Hydrated silica | NipsilAQ*[9] | Hydrated silicate A | Hydrated silicate B | Hydrated silicate C |
| C T A B | 165 | 79 | 180 | 105 |
| Value of formula (I) | 27.40 | 58.00 | 22.00 | 49.00 |
| Value of formula (I') |  | 65.60 |  | 51.60 |
| Value of formula (II) | 27.0 |  | 24.0 |  |
| I B | 34.10 | 55.00 | 20.00 | 44.50 |
| (Weight loss on ignition)-(Weight loss on heating) (mass %) | 2.6 | 3.0 | 3.2 | 3.1 |
| Silane coupling*[13] | Si69 | Si69 | Si69 | Si69 |
|  | Evaluation | | | |
| Wear resistance | 100 | 99 | 121 | 102 |
| Rolling resistance | 100 | 117 | 101 | 109 |

*[9]"Nipsil AQ", manufactured by Tosoh Silica Corporation
*[13]Bis(3-triethoxysilylpropyl)tetrasulfide, "Si69", manufactured by Evoik Degussa Corporation M2: Diameter of opening exhibiting the maximum value of mercury discharge rate when pressure is decreased from 32000 PSI to 1 PSI IB: Ink bottle-shaped micropore index

The invention claimed is:

1. A rubber composition, comprising:
a rubber component; and
a hydrated silica having particles each provided with micropores with openings in the range of $1.2\times10^5$ nm to 6 nm formed at outer surface of the particle,
wherein in measurement according to a mercury press-in method using a mercury porosimeter of the hydrated silica, provided that:
M1 (nm) represents diameter of the opening exhibiting the maximum value of mercury charge rate when pressure is increased from 1 PSI to 32000 PSI;
M2 (nm) represents diameter of the opening exhibiting the maximum value of mercury discharge rate when pressure is decreased from 32000 PSI to 1 PSI;
IB represents ink bottle-shaped micropore index;

$$IB=M2-M1 \qquad (X); \text{ and}$$

CTAB (m²/g) represents specific surface area by cetyltrimethylammonium bromide adsorption,
IB and CTAB satisfy following formula (I), $$IB \leq -0.36 \times CTAB + 86.8 \qquad (I).$$

2. A rubber composition, comprising:
a rubber component; and
a hydrated silica having particles each provided with micropores with openings in the range of $1.2\times10^5$ nm to 6 nm formed at outer surface of the particle,
wherein in measurement according to a mercury press-in method using a mercury porosimeter of the hydrated silica, provided that:
M1 (nm) represents diameter of the opening exhibiting the maximum value of mercury charge rate when pressure is increased from 1 PSI to 32000 PSI;
M2 (nm) represents diameter of the opening exhibiting the maximum value of mercury discharge rate when pressure is decreased from 32000 PSI to 1 PSI;
IB represents ink bottle-shaped micropore index;

$$IB=M2-M1 \qquad (X);$$

CTAB (m²/g) represents specific surface area by cetyltrimethylammonium bromide adsorption;
weight loss on ignition (mass %) represents weight loss when the hydrated silica is heated at 750° C. for 3 hours; and
weight loss on heating (mass %) represents weight loss when the hydrated silica is heated at 105° C. for 2 hours,
IB and CTAB satisfy following formula (I') and formula (II) and weight loss on ignition and weight loss on heating satisfy formula (III), $$IB \leq -0.56 \times CTAB + 110.4 \text{ (when CTAB} \leq 140) \qquad (I')$$

$$IB \leq -0.20 \times CTAB + 60.0 \text{ (when CTAB} > 140) \qquad (II)$$

$$(\text{"weight loss on ignition"}-\text{"weight loss on heating"}) \geq 2.5 \text{ (mass \%)} \qquad (III).$$

3. The rubber composition of claim 1, wherein specific surface area by cetyltrimethylammonium bromide adsorption (CTAB) of the hydrated silica is in the range of 50 m²/g to 300 m²/g.

4. The rubber composition of claim 1, wherein the rubber component is made of natural rubber and/or diene-based synthetic rubber, and 10 to 150 parts by mass of the hydrated silica is blended with 100 parts by mass of the rubber component.

5. The rubber composition of claim 1, wherein 1 to 20 parts by mass of silane coupling agent may be blended with 100 parts by mass of the hydrated silica.

6. The rubber composition of claim 5, wherein the silane coupling agent is at least one compound selected from the group consisting of a compound represented by following formula (IV), a compound represented by following formula (V), a compound represented by following formula (VI), and a compound represented by following formula (VII);

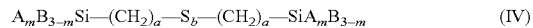

$$A_mB_{3-m}Si-(CH_2)_a-S_b-(CH_2)_a-SiA_mB_{3-m} \qquad (IV)$$

in formula (IV), A represents $C_nH_{2n+1}O$, n represents integer in the range of 1 to 3, or chlorine atom, B represents $C_{1-3}$ alkyl group, m represents integer in the range of 1 to 3, a represents integer in the range of 1 to 9, and b represents integer equal to or larger than 1, when m=1, the Bs may be the same or different, when m=2 or 3, the As may be the same or different,

$$A_mB_{3-m}Si-(CH_2)_c-Y \qquad (V)$$

in formula (V), A represents $C_nH_{2n+1}O$, n represents integer in the range of 1 to 3, or chlorine atom, B represents $C_{1-3}$ alkyl group, Y represents mercapto, vinyl, amino, glycidoxy or epoxy group, m represents integer in the range of 1 to 3, and c represents integer in the range of 1 to 9, when m=1, the Bs may be the same or different, when m=2 or 3, the As may be the same or different,

$$A_mB_{3-m}Si-(CH_2)_a-S_b-Z \qquad (VI)$$

in formula (VI), A represents $C_nH_{2n+1}O$, n represents integer in the range of 1 to 3, or chlorine atom, B represents $C_{1-3}$ alkyl group, Z represents benzothiazoryl, N,N-dimethylthiocarbamoyl or methacryloyl group, m represents integer in the range of 1 to 3, a represents integer in the range of 1 to 9, and b represents integer equal to or larger than 1, when m=1, the Bs may be the same or different, when m=2 or 3, the As may be the same or different,

$$R^1_xR^2_yR^3_zSi-R^4-S-CO-R^5 \qquad (VII)$$

in formula (VII), $R^1$ is selected from the group consisting of $R^6O-$, $R^6C(=O)O-$, $R^6R^7C=NO-$, $R^6R^7NO-$, $R^6R^7N-$, and $-(OSiR^6R^7)_n(OSiR^5R^6R^7)$ and the number of carbon atoms of $R^1$ is in the range of 1 to 18, provided that $R^6$ and $R^7$ are independently selected from the group consisting of alkyl, cycloalkyl, alkenyl, cycloalkenyl and aryl groups, the number of carbon atoms of $R^6$ and $R^7$ is in the range of 1 to 18, n is an integer in the range of 0 to 10; $R^2$ is selected from $C_{1-18}$ alkyl, $C_{1-18}$ cycloalkyl, $C_{1-18}$ alkenyl, $C_{1-18}$ cycloalkenyl and $C_{1-18}$ aryl groups; $R^3$ is selected from $-[O(R^8O)_m]_{0.5}-$, provided that $R_8$ is selected from $C_{1-18}$ alkylene group and $C_{1-18}$ cycloalkylene group and m represents integer in the range of 1 to 4; x, y and z satisfy equations including x+y+2z=3, $0 \leq x \leq 3$, $0 \leq y \leq 2$, and $0 \leq z \leq 1$; $R^4$ is selected from $C_{1-18}$ alkylene, $C_{1-18}$ cycloalkylene, $C_{1-18}$ cycloalkylalkylene, $C_{1-18}$ alkenylene, $C_{1-18}$ arylene, and $C_{1-18}$ aralkylene groups; and $R^5$ is selected from $C_{1-18}$ alkyl, $C_{1-18}$ cycloalkyl, $C_{1-18}$ alkenyl, $C_{1-18}$ cycloalkenyl, $C_{1-18}$ aryl, and $C_{1-18}$ aralkyl groups.

7. The rubber composition of claim 5, wherein 0 to 80 parts by mass of carbon black is blended with 100 parts by mass of the rubber component so that the total content of the hydrated silica and the carbon black is equal to or less than 120 parts by mass.

8. A pneumatic tire, comprising a component member containing the rubber composition of claim 1.

* * * * *